US010897844B2

(12) United States Patent
Morris et al.

(10) Patent No.: US 10,897,844 B2
(45) Date of Patent: Jan. 26, 2021

(54) MOWER UNIT MOUNTABLE TO TRAVELING VEHICLE BODY

(71) Applicant: KUBOTA CORPORATION, Osaka (JP)

(72) Inventors: Benjamin Morris, Lula, GA (US); Phillip Smith, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 204 days.

(21) Appl. No.: 15/595,059

(22) Filed: May 15, 2017

(65) Prior Publication Data
US 2018/0325025 A1 Nov. 15, 2018

(51) Int. Cl.
| A01D 34/66 | (2006.01) |
| A01D 34/71 | (2006.01) |
| A01D 34/81 | (2006.01) |
| B60L 1/00 | (2006.01) |

(52) U.S. Cl.
CPC ........... *A01D 34/667* (2013.01); *A01D 34/71* (2013.01); *A01D 34/81* (2013.01); *B60L 1/003* (2013.01)

(58) Field of Classification Search
CPC ...... A01D 34/667; A01D 34/71; A01D 34/81; A01D 34/005
See application file for complete search history.

(56) References Cited

U.S. PATENT DOCUMENTS

| 4,543,773 A * | 10/1985 | Reilly | A01D 34/66 56/13.6 |
| 5,457,947 A * | 10/1995 | Samejima | A01D 34/005 56/16.7 |
| 5,732,540 A * | 3/1998 | Samejima | A01D 34/66 56/16.7 |
| 5,845,475 A * | 12/1998 | Busboom | A01D 34/005 56/320.1 |
| 5,894,717 A * | 4/1999 | Yamashita | A01D 34/005 56/17.5 |
| 6,360,517 B1 * | 3/2002 | Ishimori | A01D 34/71 56/255 |
| 6,892,519 B2 * | 5/2005 | Sugden | A01D 34/005 56/17.4 |
| 7,093,415 B2 * | 8/2006 | Kallevig | A01D 34/005 56/320.2 |
| 7,299,613 B2 * | 11/2007 | Samejima | A01D 34/005 56/320.1 |

(Continued)

*Primary Examiner* — Thomas B Will
*Assistant Examiner* — Joan D Misa
(74) *Attorney, Agent, or Firm* — Greenblum & Bernstein, P.L.C.

(57) ABSTRACT

Mower unit mountable to a traveling vehicle body and being configured to suppress generation of turbulence. The mower includes a mower deck, a plurality of blades, a rear vacuum plate that includes a plurality of arcuate portions and a convexly curved portion curved to extend into a triangular gap portion formed between two adjacent rotational locus circles. The convex curved portion bridges opposed ends of two adjacent arcuate portions at two inflection points (IP) of the rear vacuum plate. The triangular gap is defined by a distance (S) between the two inflection points (IP) and a top point (TP) located at a distance (L) from a reference straight line connecting center points of the two adjacent rotational locus circles.

12 Claims, 7 Drawing Sheets

(56) References Cited

U.S. PATENT DOCUMENTS

| | | | | |
|---|---|---|---|---|
| 7,360,352 B2* | 4/2008 | Samejima | ............... | A01D 34/71 56/320.1 |
| 7,617,665 B2* | 11/2009 | Yamashita | ............ | A01D 42/005 56/320.2 |
| 7,665,286 B2* | 2/2010 | Butler | ................... | A01D 34/005 56/320.1 |
| 7,685,799 B2* | 3/2010 | Samejima | ............ | A01D 34/005 56/320.1 |
| 7,866,135 B2* | 1/2011 | Davis | ..................... | A01D 34/71 56/320.2 |
| 8,156,722 B2* | 4/2012 | Sugio | ................... | A01D 34/005 56/320.1 |
| 8,171,709 B1* | 5/2012 | Bedford | ............... | A01D 34/005 56/320.2 |
| 8,555,608 B2* | 10/2013 | Geiger | ................... | A01D 34/71 56/320.1 |
| 9,699,963 B2* | 7/2017 | Ressler | ................. | A01D 75/006 |
| 9,750,179 B2* | 9/2017 | Korthals | .............. | A01D 34/005 |
| 10,172,281 B2* | 1/2019 | Poole | ................... | A01D 34/667 |
| 2015/0052868 A1* | 2/2015 | Schreiner | ............ | A01D 34/66 56/17.5 |
| 2017/0245433 A1* | 8/2017 | Derra | ................... | A01D 34/005 |
| 2018/0020616 A1* | 1/2018 | Poole | ................... | A01D 34/667 56/320.1 |

* cited by examiner

MOWER UNIT MOUNTABLE TO TRAVELING VEHICLE BODY

TECHNICAL FIELD

The present invention relates to a mower unit mountable to a traveling vehicle body. Such mower unit includes a mower deck configured to support a plurality of blades rotatably about vertical rotational axes. In order to suppress scattering of mowed grass clippings around, but to allow discharging thereof along a predetermined route, to a lower face of the mower deck, there is attached a partitioning wall called a "rear vacuum plate", along rotational locus circles of the plurality of blades.

BACKGROUND

U.S. Pat. No. 5,732,540 discloses a mower unit having a cutter blade housing accommodating three blades rotatable about vertical axes. Rearwardly of the blades, a rear vacuum plate is provided. The rear vacuum plate has three concave arcuate portions having a shape along the rotational loci of the respective blade. The concave arcuate portions are connected to each other via a bridging portion that is bent in the opposite direction to the concave arcuate portions. Further, in order to suppress mutual contact among grass clippings as being dragged by the blades, from this bridging portion, extension guide pieces extend into the rotational loci.

U.S. Pat. No. 7,685,799 too discloses a mower unit similar to the one disclosed by U.S. Pat. No. 5,732,540. In this mower unit, no extension guide pieces are provided, but the bridge portion is formed sharper to project into the rotational loci deeper.

Further, U.S. Pat. No. 7,617,665 discloses a mower unit having a cutter blade housing accommodating two blades rotatable about vertical axes. Rearwardly of the blades, a rear vacuum plate is provided. The bridge portion of this rear vacuum plate is deflected toward the rotational locus of one blade, and a portion of the concave arcuate portion facing the other blade does not extend along the rotational locus.

In the case of conventional mower units including the above-described mower units, the shape of the bridge portion interconnecting the concave arcuate portions together constituting the rear vacuum plate is not positively considered. In fact, this shape of bridge portion affects air current generated by the blades. In particular, the shape affects generation and magnitude of turbulence. Such turbulence deteriorates the grass mowing performance in an area where the rotational loci of blades disposed adjacent in the traveling direction of the traveling vehicle body are overlapped with each other.

SUMMARY

A primary object of the present invention is to provide a mower unit capable of suppressing the above-described generation of turbulence, thus improving the grass mowing performance in the area where the rotational loci of blades adjacent in the traveling direction of the traveling vehicle body are overlapped with each other.

A mower unit mountable to a traveling vehicle body, according to the present invention, comprises:

a mower deck;

a plurality of blades supported to the mower deck to be rotatable about vertical rotational axes;

a rear vacuum plate disposed rearwardly of rotational locus circles of the plurality of blades and attached to a lower face of the mower deck;

the rear vacuum plate includes:

a plurality of arcuate portions formed arcuate to extend along the respective rotational locus circles of the blades; and a convexly curved portion (a bridge portion) curved to extend into a triangular gap portion formed between two adjacent rotational locus circles, the convex curved portion bridging opposed ends of two adjacent arcuate portions; and the convexly curved portion and the arcuate portions are connected to maintain a continuous curve.

With the above-described arrangement, the convexly curved portion is curved to extend into between the rotational locus circles and its opposed ends and the arcuate portions are connected to maintain a continuous curve. This arrangement suppresses turbulence generated by the convexly curved portion, thus improving the grass mowing performance in the area where the rotational locus circles of blades adjacent in the traveling direction of the traveling vehicle body are overlapped with each other.

Preferably, the convexly curved portion is curved arcuate. With this, both the arcuate portion and the convexly curved portion are formed arcuate, so that an air current generated by the blades can smoothly pass the convexly curved portion and the arcuate portions. Consequently, the turbulence generated by the convexly curved portion can be further suppressed.

Still preferably, the rear vacuum plate including the arcuate portions and the convexly curved portion is formed by bending a single plate member. With this, the arcuate portions and the convexly curved portion are formed integral, thus providing smooth transition between the arcuate portions and the convexly curved portion advantageously. This arrangement is advantageous in the respect of cost also.

DETAILED DESCRIPTION

Next, there will be explained a lawn mower as one embodiment of a work vehicle relating to the present invention with reference to the accompanying drawings. This lawn mower is a riding type lawn mower having a vehicle body frame 10 supported by a pair of left and right front wheels 11 and a pair of left and right rear wheels 12. In this detailed description, unless indicated otherwise, a term "front (forward)" means a front (forward) side with respect to the vehicle body front/rear direction (traveling direction), and a term "rear" means a rear side with respect to the vehicle body front/rear direction (traveling direction). Further, a left-right direction or lateral direction means a vehicle body transverse direction (vehicle body width direction)

perpendicular to the vehicle body front/rear direction. A term "upper" or "lower" refers to positional relationship in the perpendicular direction of the vehicle body (vertical direction) and represents a relationship in the respect of the ground-clearance.

Figure 1:
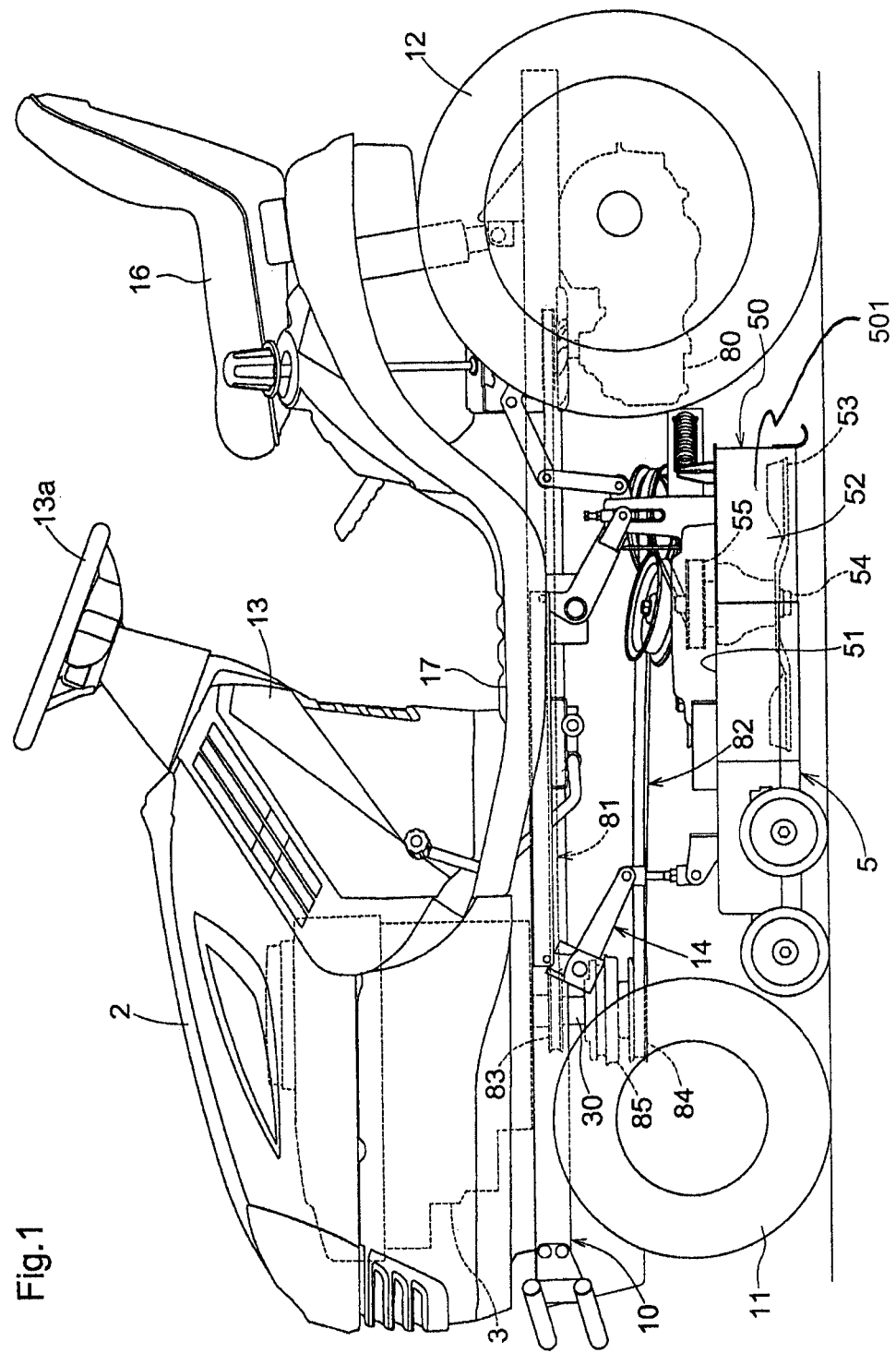
FIG. 1 is a side view of a lawn mower as one embodiment of a work vehicle.
Figure 2:
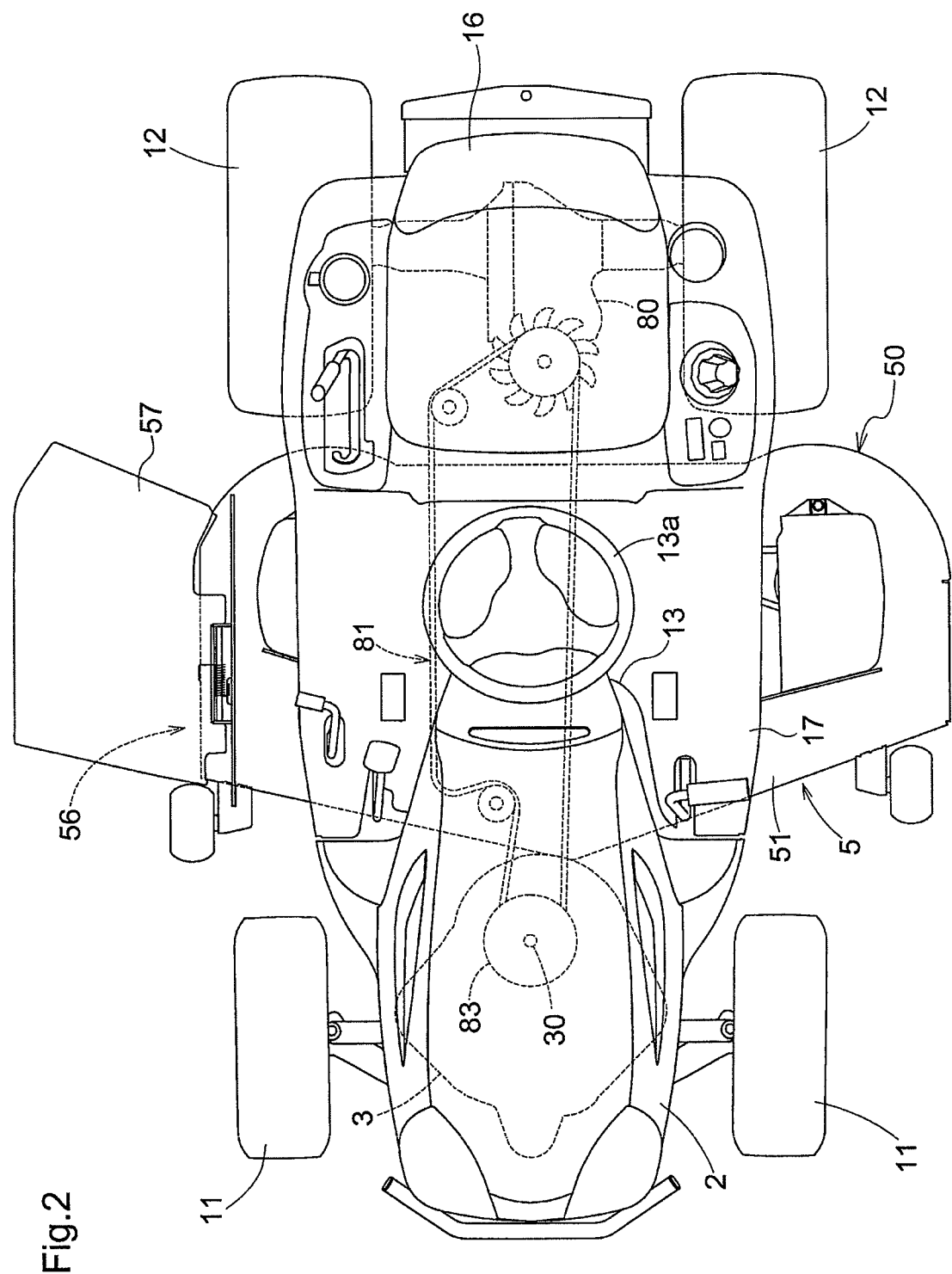
FIG. 2 is a plane view of the lawn mower.

As shown in FIG. 1 and FIG. 2, the lawn mower includes the vehicle body frame consisting of a pair of left and right longitudinal beams extending in a vehicle body front/rear direction and cross beams interconnecting the longitudinal beams. The vehicle body frame 10 mounts the front wheels 11 which are steered by a steering wheel 13a supported to a handle post panel 13 and the rear wheels 12 which receive speed-changed power via a stepless speed changer device 80. Under this vehicle body frame 10 and between the front wheels 11 and the rear wheels 12, there is disposed a mower unit 5 which is suspended to be parallel liftable up/down via a link type lift mechanism 14. At a front portion of the vehicle body frame 10, a vertical shaft type engine 3 is mounted. This engine 3 is covered from above by an engine hood 2. A rear opening of the engine hood 2 is closed by the handle post panel 13. Further, upwardly of the vehicle body frame 10, there is disposed a floor panel 17 which extends from the handle post panel 13 to the upper side of the rear wheels 12. At a rear portion of the floor panel 17, a driver's seat 16 is provided. Downwardly of the floor panel 17, there are disposed a first belt transmission mechanism 81 for transmitting power from the engine 3 to the stepless speed changer device 80 and a second belt transmission mechanism 82 for transmitting power from the engine 3 to the mower unit 5. A speed changing ratio of the stepless speed changer device 80 is varied, based on an operational amount of a speed changer operational tool operated by the driver.

The engine 3 has an engine output shaft 30 extending in the vertical direction. This engine output shaft 30 projects to the lower side of the vehicle body frame 10. Downwardly of the engine output shaft 30, there are provided a first pulley 83 of the first belt transmission mechanism 81 and a second pulley 84 of the second belt transmission mechanism 82. Between the first pulley 83 and the second pulley 84, there is provided a PTO clutch 85 for switching ON/OFF transmission of engine power to the second belt transmission mechanism 82.

Figure 3:
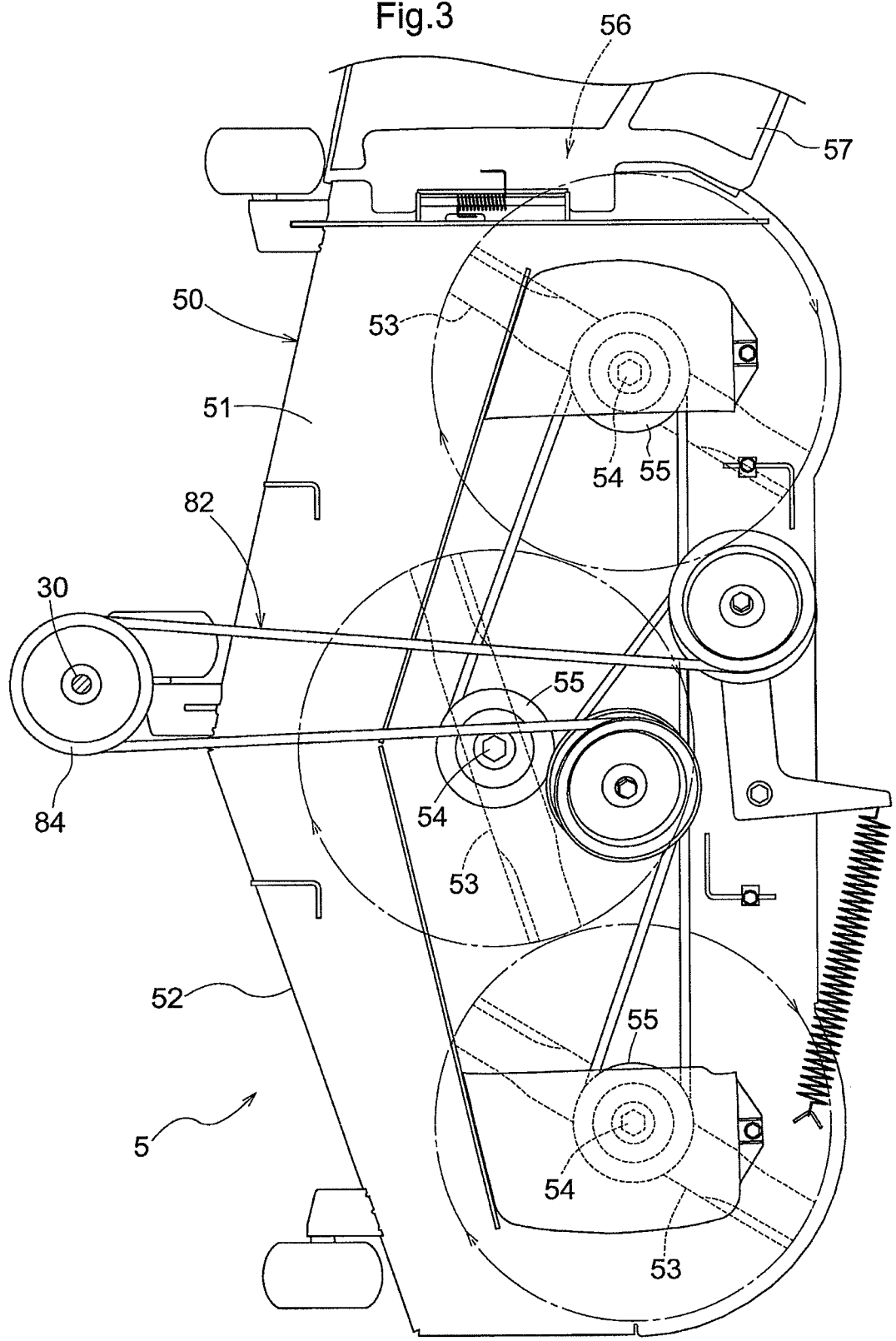
FIG. 3 is a plane view of a mower unit.

As shown in FIG. 1 and FIG. 3, the mower unit 5 includes a mower deck 50 comprised of a ceiling plate 51 and a side plate 52. In the instant embodiment, in an inner space 501 comprising a cutting chamber created by the ceiling plate 51 and the side plate 52 of the mower deck 50, three plate-like blades 53 are accommodated in juxtaposition along the vehicle body transverse direction. Each blade 53 is fixed to a lower end of one of three blade rotary shafts 54 rotatably supported to the ceiling plate 51 of the mower deck 50. The respective blade rotary shafts 54 extend vertically upward through the ceiling plate 51 of the mower deck 50. At an upper end of the blade rotary shaft 54, an input pulley 55 is provided. This input pulley 55 receives power from the second belt transmission mechanism 82. At one end of the mower deck 50 in the lateral direction, there is formed an opening 56 for laterally discharging mowed grass clippings mowed by the blades 53, and to the upper side of this opening 56, there is provided a foldable side cover 57 for preventing upward scattering of the discharged mowed grass clippings.

Figure 4:
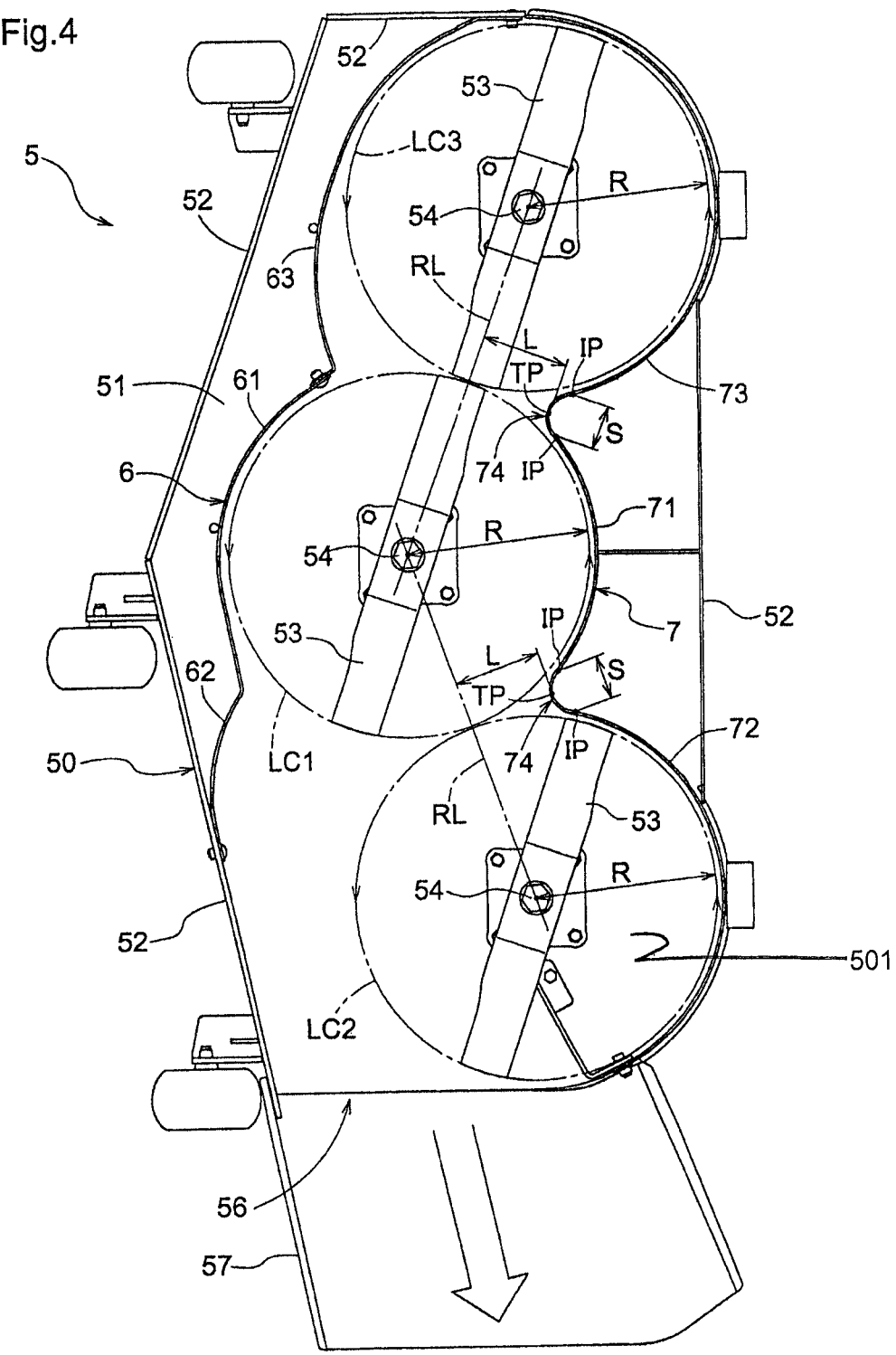
FIG. 4 is a rear view of a mower unit having three blades.

As shown in FIG. 4, to the lower face of the ceiling plate 51 of the mower deck 50, there are provided a front vacuum plate 6 and a rear vacuum plate 7. In regard to the forward traveling direction, the front vacuum plate 7 is located on the front side of the blade 53 and the rear vacuum plate 7 is located on the rear side of the same. In FIG. 4, a rotational locus circle LC1 of the blade 53 located centrally projects more on the front side than a rotational locus circle LC2 of the blade 53 located on the right side and a rotational locus circle LC3 of the blade 53 located on the left side. The three rotational locus circles, i.e. the rotational locus circle LC1 and the rotational locus circle LC2, as well as the rotational locus circle LC1 and the rotational locus circle LC3, are disposed close to each other immediately before contacting and are slightly overlapped with each other in regard to the traveling direction.

The front vacuum plate 6 consists of a first curved portion 61, a second curved portion 62 and a third curved portion 63. One end of the second curved portion 62 is connected with one end of the first curved portion 61 and the other end of the second curved portion 62 is connected with the side plate 52 of the mower deck 50. One end of the third curved portion 63 is connected with the other end of the first curved portion 61 and the other end of the third curved portion 63 is connected with the side plat 52 of the mower deck 50. The first curved portion 61 is shaped arcuate whose most portion extends along the rotational locus circle LC1 and in close vicinity of this rotational locus circle LC1. The second curved portion 62 is distant from the rotational locus circle LC2 and creates therebetween, with this the rotational locus circle LC2, a path for guiding grass clippings to the opening 56. A half of the third curved portion 63 extends with a progressively increasing distance from the rotational locus circle LC2 as it approaches the first curved portion 61, whereas the remaining half thereof is formed arcuate along the rotational locus circle LC1 in close vicinity of this rotational locus circle LC1.

The rear vacuum plate 7 is formed of a single plate and consist of a first arcuate portion 71, a second arcuate portion 72, a third arcuate portion 73 and two convexly curved portions 74. The first arcuate portion 71 has an arcuate shape closely along the rotational locus circle LC1. The second arcuate portion 72 has an arcuate shape closely along the rotational locus circle LC2. The third arcuate portion 73 has an arcuate shape closely along the rotational locus circle LC3. Opposed ends of the first arcuate portion 71 are connected respectively to one end of the second arcuate portion 72 and one end of the third arcuate portion 73 via the convexly curved portion 74. The other end of the second arcuate portion 72 and the other end of the third arcuate portion 73 are connected respectively to the ceiling plate 51 and/or the side plate 52 of the mower deck 50.

Figure 5:
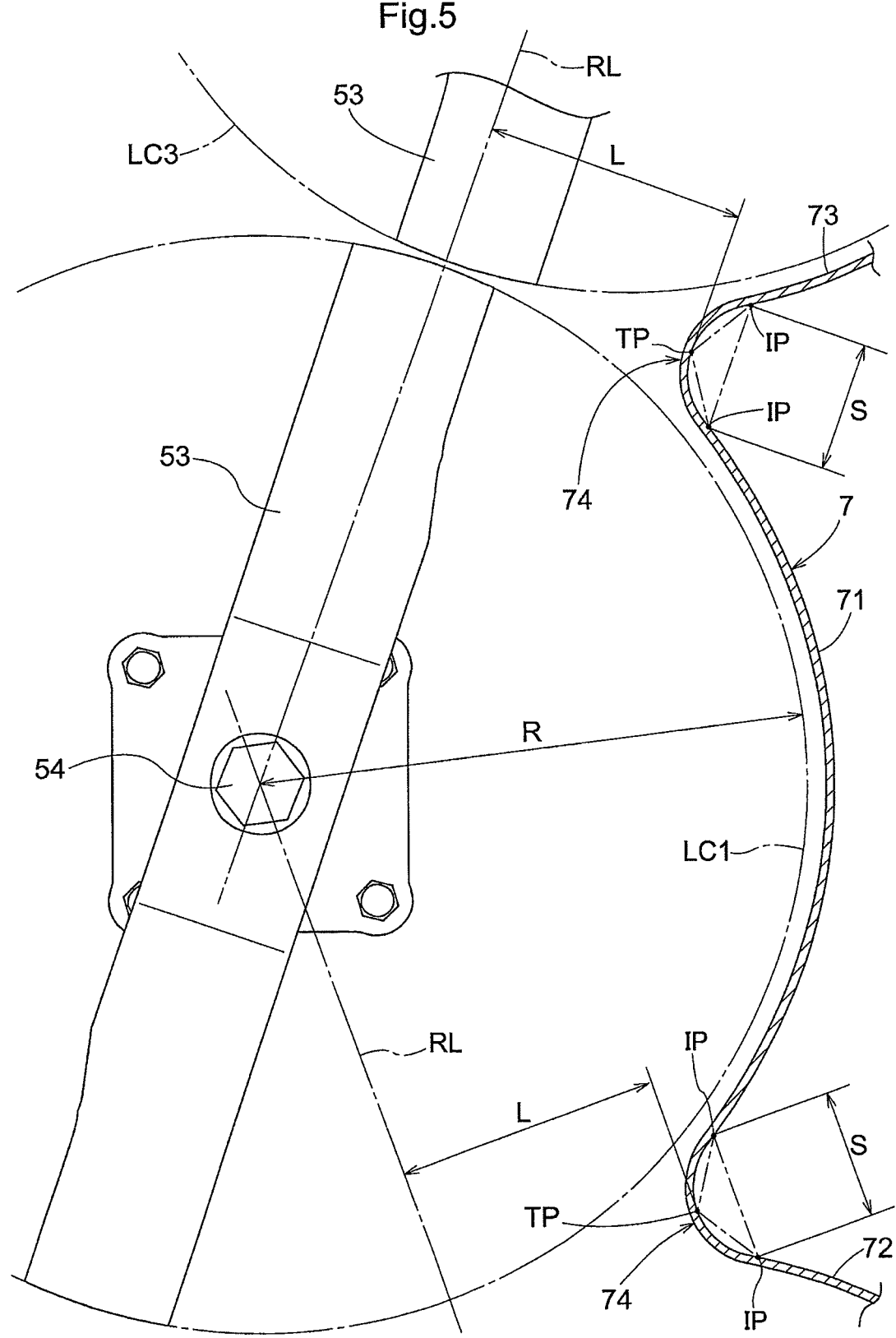
FIG. 5 is an enlarged rear view showing arcuate portions and convexly curved portions of the three-blade mower unit.

As shown in FIG. 5, each convexly curved portion 74 is curved to extend into a triangular gap portion (a curved triangular area outside the two rotational locus circles) formed between the two adjacent rotational locus circles LC1 and LC2 or LC1 and LC3. In this instant embodiment, the convexly curved portions 74 are curved substantially arcuate.

Further, the concavely curved portions 74, the first arcuate portion 71, the second arcuate portion 72 and the third arcuate portion 73 extend to form a continuous curve line. More particularly, in the area of transition from the convexly curved portion 44 to the arcuate portions 71, 72, 73, substantially no straight portions or projections are present, thus providing smooth continuous transition.

As shown in FIG. 5, the connection points (transition points) between the concavely arcuate portions 71, 72, 73 and the convexly curved portions 74 are provided as inflection points IP. The arcuate portions 71, 72, 73 having negative radius of curvature shift to the convexly curved portion 74 having positive radius of curvature, via/across the inflection point IP therebetween. A triangle formed by connecting the inflection points IP as the opposed ends of the convexly curved portion 74 and a top point TP of this convexly curved portion 74 is an obtuse-angled isosceles triangle whose top point TP has an obtuse angle.

The present invention proposes two specific size conditions effective for suppressing turbulence caused by the convexly curved portion 74 in the air current caused by the blades 53. Incidentally, in the following discussion, a distance between the opposed ends of the convexly curved portion 73 (i.e. the distance between the ends of the two arcuate portions 71 and 72 or between 71 and 73) will be represented by a mark (S), and the radius of the rotational locus circles of the blades 53 will be represented by a mark (R) and a distance from a reference straight line RL interconnecting the respective centers of the two adjacent rotational locus circles LC1 and LC2 or LC1 and LC3 with the top point TP of the convexly curved portion 74 will be represented by a mark (L).

First Condition

The distance S: between the opposed ends of the convexly curved portion is longer than ⅕ of the radius R of the rotational locus circles (S>R/5) AND the distance S is shorter than ⅔ of the radius R of the rotational locus circles (S<2×R/3); namely, $R/5 < S < 2 \times R/3$ Second Condition The distance L from the reference straight line RL to the top point TP of the convexly curved portion 74 is longer than ⅓ of the radius R of the rotational locus circles (L>R/3) AND the distance L is shorter than ⅔ of the radius R of the rotational locus circles (L<2×R/3); namely, $R/3 < L < 2 \times R/3$ When either one of First Condition and Second Condition or both of First Condition and Second Condition defined above is/are satisfied, turbulence is suppressed, so that grass mowing performance in the area where the rotational loci of blades are overlapped with each other is improved.

Further, in case the mower unit 5 is configured as a three-blade type as shown in FIG. 4 and FIG. 5, with application of further strict condition in addition to First Condition and/or to Second Condition described above, further advantageous effects can be achieved. For instance, First Condition can be added with an additional condition (S<R/3), i.e. the distance S being shorter than ⅓ of the radius R of the rotational locus circles. With this, the more strict First Condition limited to the three-blade type is:

$R/5 < S < R/3$

Also, Second Condition can be added with an additional condition (L<R/2), i.e. the distance L being shorter than ⅔ of the radius R of the rotational locus circles. With these combined, the more strict Second Condition limited to the three-blade type is:

$R/3 < L < R/2$

Figure 6:
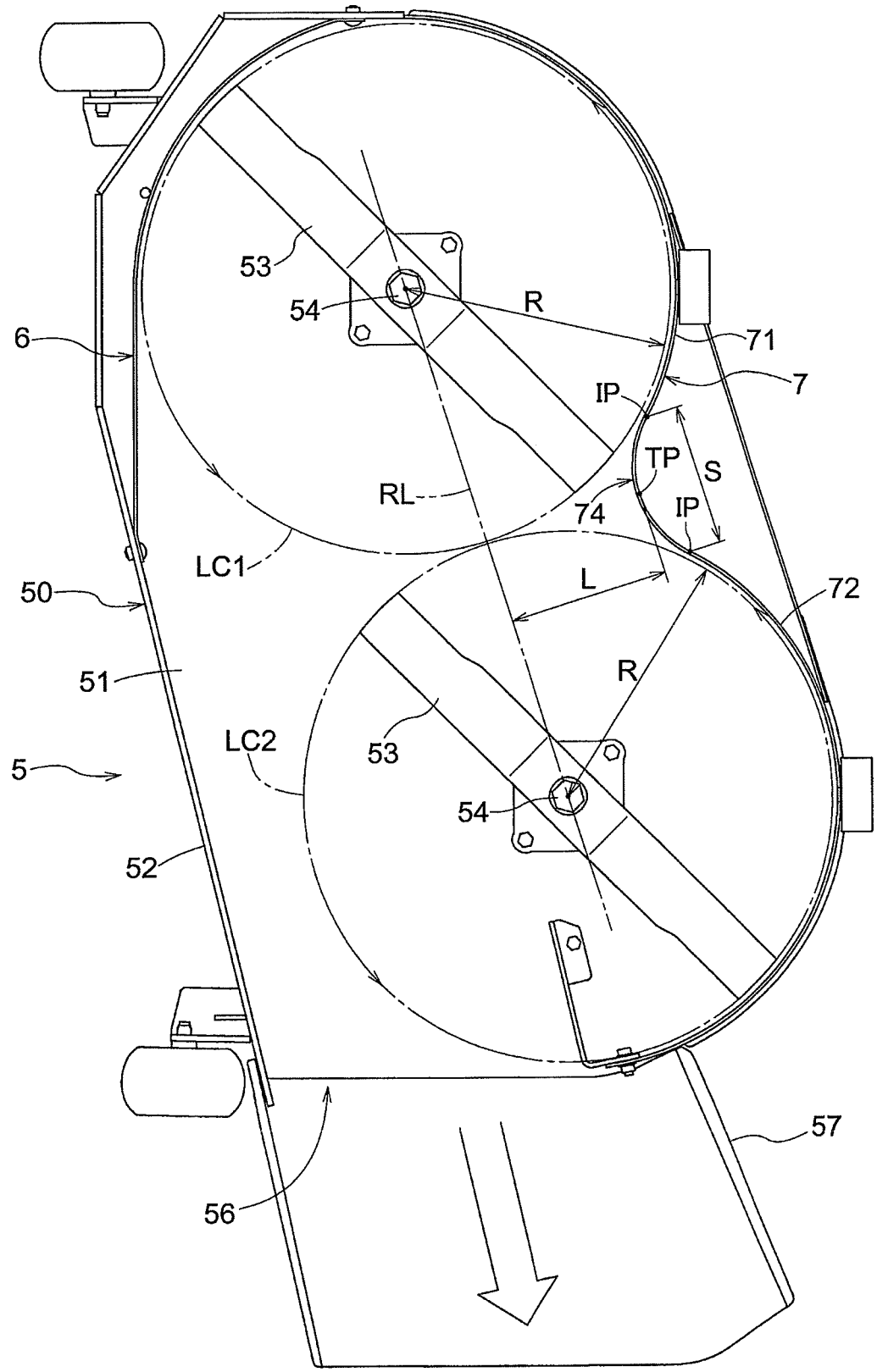
FIG. 6 is a rear view of a mower unit having two blades.
Figure 7:
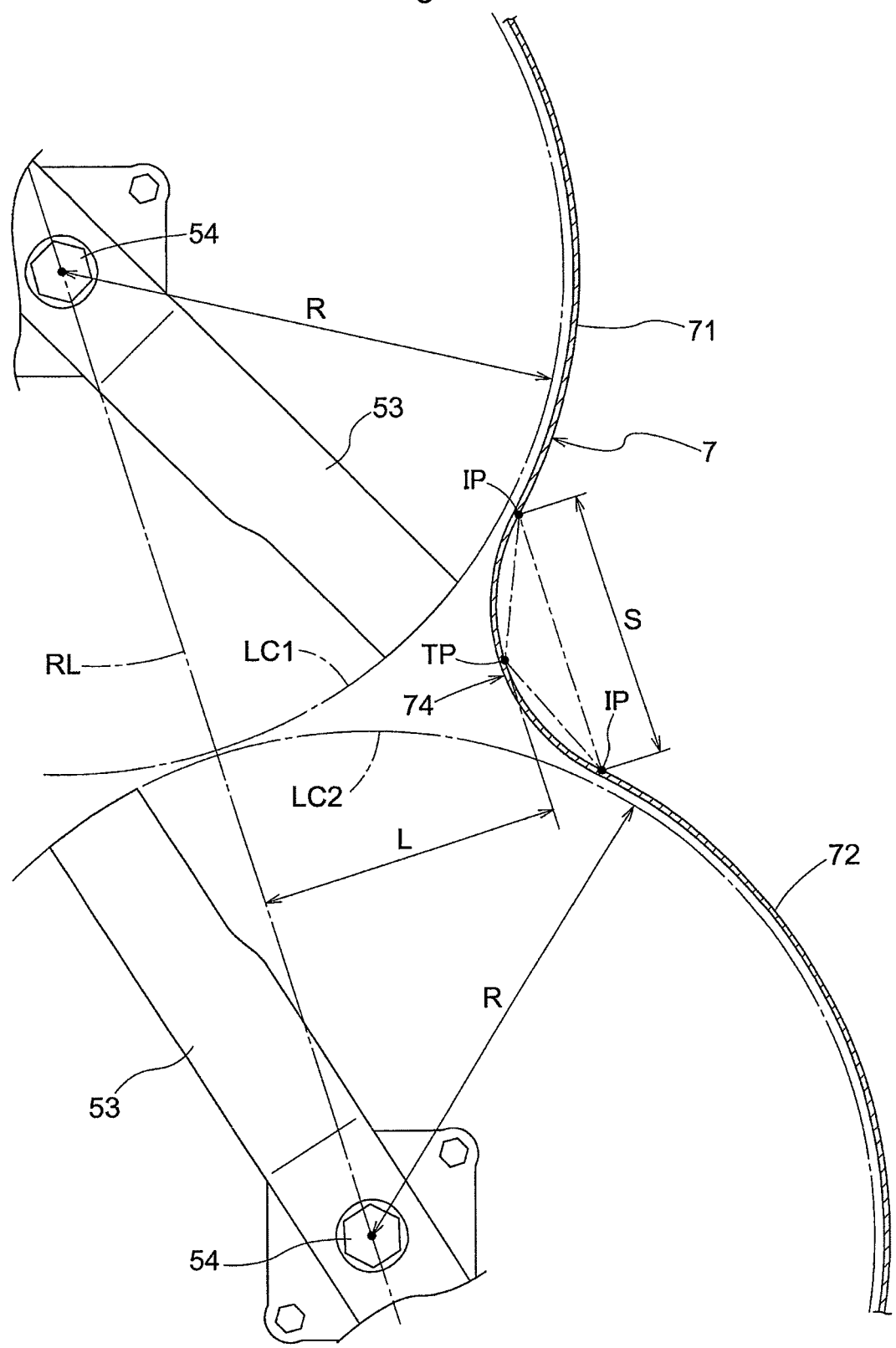
FIG. 7 is an enlarged rear view showing arcuate portions and a convexly curved portion of the two-blade mower unit.

In the foregoing embodiment, the mower unit 5 is configured as the three-blade type. The present invention is applicable also to a two-blade type mower unit shown in FIG. 6 and FIG. 7. The two-blade type includes two arcuate portions (the first arcuate portion 71 and the second arcuate portion 72) and one convexly curved portion 74. The reference marks (numerals) shown in FIGS. 6 and 7 are same as those in FIGS. 4 and 5.

For this two-blade type mower unit 5, the above-described First Condition and Second Condition remain same. However, additional conditions therefor can be proposed different as follows.

According to an additional condition proposed to be added to First Condition for the two-blade type, the distance S is longer than ⅖ the radius R of the rotational locus circles (S>2×R/5). With this, the more strict First Condition limited to the two-blade type is:

$2 \times R/5 < S < 2 \times R/3$

Further, according to an additional condition proposed to be added to Second Condition for the two-blade type, the distance L is longer than ½ the radius R of the rotational locus circles (L>R/2). With this, the more strict Second Condition limited to the two-blade type is:

$R/2 < L < 2 \times R/3$

In the foregoing embodiment, all of the arcuate portions 71, 72, 73 and the convexly curved portion(s) 74 are formed integral. Instead, the arcuate portions and the convexly curved portion can be bonded to each other by welding.

In the foregoing embodiment, the present invention is applied to a lawn mower. However, the present invention is applicable also to a an agricultural vehicle such as a tractor or a light work vehicle such as a truck or a utility vehicle, etc.

Incidentally, the arrangements disclosed in the foregoing embodiments (including the further embodiment) can be used in any desired combination with the arrangements disclosed in further embodiment as long as such combinations are compatible with each other. Further, it should be noted that the embodiments disclosed in the above are only exemplary and the present invention is not limited to these disclosed embodiments, and various modifications and changes can be made within a range not departing from the principal object of the present invention.

The invention claimed is:

1. A mower unit mountable to a traveling vehicle body and being configured to suppress generation of turbulence, comprising:
   a mower deck;
   a plurality of blades supported to the mower deck to be rotatable about vertical rotational axes;
   a rear vacuum plate disposed rearwardly of rotational locus circles of the plurality of blades and attached to a lower face of the mower deck;
   wherein the rear vacuum plate includes:
      a plurality of arcuate portions formed arcuate to extend along the respective rotational locus circles of the blades; and
      a convexly curved portion curved to extend into a triangular gap portion formed between two adjacent rotational locus circles, the convex curved portion bridging opposed ends of two adjacent arcuate portions at two inflection points (IP) of the rear vacuum plate;
      said triangular gap being defined by a distance (S) between the two inflection points (IP) and a top point (TP) located at a distance (L) from a reference straight line connecting center points of the two adjacent rotational locus circles, and
   the convexly curved portion and the arcuate portions are connected to maintain a continuous curve, wherein the mower deck comprises an opening at a lateral end of the mower deck to allow grass clippings to be discharged through the opening when the vacuum plate is attached to the mower deck, and
wherein the mower deck utilizes at least one of the following conditions to suppress turbulence caused by the convexly curved portion:
a first condition where the distance (S) between opposing ends of the convexly curved portion is:
longer than 1/5 of a radius (R) of one of the rotational locus circles; and
shorter than 2/3 of the radius (R); or
a second condition where the distance (L) is:
longer than 1/3 of the radius (R) of one of the rotational locus circles; and
shorter than 2/3 of the radius (R).

2. The mower unit of claim 1, wherein the convexly curved portion is curved arcuate.

3. The mower unit of claim 2, wherein the convexly curved portion and the arcuate portions are formed integral.

4. The mower unit of claim 1, wherein the plurality of blades supported to the mower deck consists of three individual blades each rotatable about a respective vertical rotational axes.

5. A mower unit mountable to a traveling vehicle body and being configured to suppress generation of turbulence, comprising:
a mower deck;
a plurality of blades supported to the mower deck to be rotatable about vertical rotational axes;
a rear vacuum plate disposed rearwardly of rotational locus circles of the plurality of blades and attached to a lower face of the mower deck;
wherein the rear vacuum plate includes:
a plurality of arcuate portions formed arcuate to extend along the respective rotational locus circles of the blades; and
a convexly curved portion curved to extend into a triangular gap portion formed between two adjacent rotational locus circles, the convex curved portion bridging opposed ends of two adjacent arcuate portions at two inflection points IP of the rear vacuum plate;
said triangular gap being defined by a distance S between the two inflection points IP and a top point TP located at a distance L from a reference straight line connecting center points of the two adjacent rotational locus circles, and
the distance S being longer than 1/5 of a radius R of the rotational locus circles (S>R/5) AND the distance S being shorter than 2/3 of the radius R of the rotational locus circles (S<2R/3), whereby turbulence caused by the convexly curved portion is suppressed, and
wherein the mower deck comprises an opening at a lateral end of the mower deck to allow grass clippings to be discharged through the opening when the vacuum plate is attached to the mower deck.

6. The mower unit of claim 5, wherein:
the plurality of blades comprise a center blade, a left blade disposed on the left side of the center blade and a right blade disposed on the right side of the center blade, the center blade projecting more on the front side than the other blades; and
the rear vacuum plate comprises three said arcuate portions and two said convexly curved portions and the distance S is shorter than 1/3 of the radius R of the rotational locus circles (S<R/3).

7. The mower unit of claim 5, wherein:
the plurality of blades comprise a left blade and a right blade; and
the rear vacuum plate comprises two said arcuate portions and one said convexly curved portion and the distance S is longer than 2/5 of the radius R of the rotational locus circles (S>2R/5).

8. The mower unit of claim 5, wherein the plurality of blades supported to the mower deck consists of three individual blades each rotatable about a respective vertical rotational axes.

9. A mower unit mountable to a traveling vehicle body and being configured to suppress generation of turbulence, comprising:
a mower deck;
a plurality of blades supported to the mower deck to be rotatable about vertical rotational axes;
a rear vacuum plate disposed rearwardly of rotational locus circles of the plurality of blades and attached to a lower face of the mower deck;
wherein the rear vacuum plate includes:
a plurality of arcuate portions formed arcuate to extend along the respective rotational locus circles of the blades; and
a convexly curved portion curved to extend into a triangular gap portion formed between two adjacent rotational locus circles, the convex curved portion bridging opposed ends of two adjacent arcuate portions at two inflection points IP of the rear vacuum plate;
said triangular gap being defined by a distance S between the two inflection points IP and a top point TP located at a distance L from a reference straight line connecting center points of the two adjacent rotational locus circles; and
the distance L being longer than 1/3 of the radius R of the rotational locus circles (L>R/3) AND the distance L being shorter than 2/3 of the radius R of the rotational locus circles (L<2×R/3), whereby turbulence caused by the convexly curved portion is suppressed, and
wherein the mower deck comprises an opening at a lateral end of the mower deck to allow grass clippings to be discharged through the opening when the vacuum plate is attached to the mower deck.

10. The mower unit of claim 9, wherein:
the plurality of blades comprise a center blade, a left blade disposed on the left side of the center blade and a right blade disposed on the right side of the center blade, the center blade projecting more on the front side than the other blades; and
the rear vacuum plate comprises three said arcuate portions and two said convexly curved portions and the distance L is shorter than 1/2 of the radius R (L<R/2).

11. The mower unit of claim 9, wherein:
the plurality of blades comprise a left blade and a right blade; and
the rear vacuum plate comprises two said arcuate portions and one said convexly curved portion and the distance L is longer than 1/2 of the radius R (L>R/2).

12. The mower unit of claim 9, wherein the plurality of blades supported to the mower deck consists of three individual blades each rotatable about a respective vertical rotational axes.

* * * * *